Figure 1:
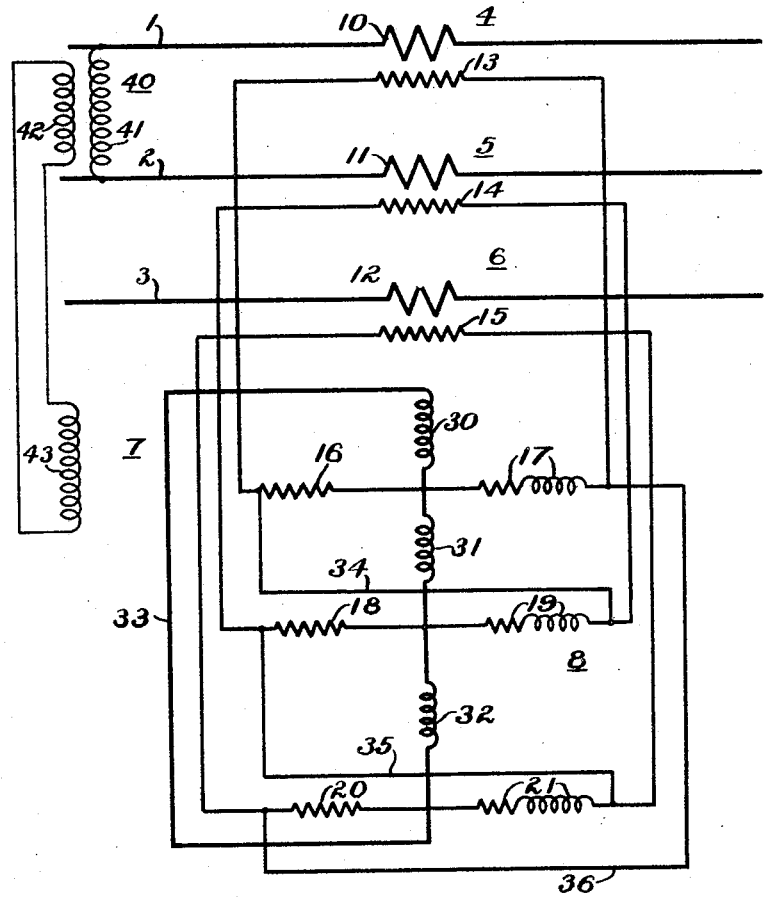

Feb. 2, 1926.

A. NYMAN 1,571,911

ELECTRICAL MEASURING INSTRUMENT

Original Filed August 18, 1921

WITNESSES:
L. F. Sonnemann,
W. R. Coley

INVENTOR
Alexander Nyman.
BY
Wesley G. Carr
ATTORNEY

Patented Feb. 2, 1926.

1,571,911

UNITED STATES PATENT OFFICE.

ALEXANDER NYMAN, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed August 18, 1921, Serial No. 493,338. Renewed January 7, 1926.

*To all whom it may concern:*

Be it known that I, ALEXANDER NYMAN, a citizen of the United States, and a resident of Swissvale, in the county of Allegheny and State of Pennsylvania, have invented a new and useful Improvement in Electrical Measuring Instruments, of which the following is a specification.

My invention relates to measuring instruments and particularly to phase meters for polyphase electrical circuits.

In practicing my invention, I utilize the network described by C. T. Allcutt in his application Serial No. 370,229, filed March 31, 1920, and assigned to the Westinghouse Electric & Manufacturing Company.

In that arrangement, two impedance devices, properly proportioned, are so connected to the circuit as to establish an artificial regular polygon of forces in which the number of sides corresponds to the number of phases in the circuit.

By properly connecting the impedance devices to the circuit, potential differences may be established between predetermined points of the network that will be proportional to the value of either the positive or the negative phase-sequence component of a polyphase quantity of the circuit, when that becomes unbalanced. This value is also a direct measure of the negative phase-sequence component of the unbalanced current.

By transposing the reactive devices, the potential difference of the same points of the network to which the measuring instrument is connected may be caused to vary with, or correspond to, the value of the positive phase-sequence component of the current.

In utilizing the above mentioned system for my invention, I employ a plurality of transformers which are respectively associated with the several conductors of the circuit. I also connect to the several current transformers impedance devices which cooperate in a manner similar to that outlined above, whereby either the positive phase-sequence component or the negative phase-sequence component of the current may be segregated. I also provide a power-factor meter comprising three stationary current coils that are angularly displaced by 120° and a movable voltage coil which is free to adjust itself in accordance with the field set up by the currents traversing the current coils.

By properly connecting the several coils so that they are respectively energized by one element of the positive phase-sequence component and also energizing the voltage coil by voltage from any phase of the circuit, the power factor of the positive phase-sequence power may be measured, that is, the angle between the positive phase-sequence current and the positive phase-sequence voltage. Since the current windings are respectively energized by the balanced currents of the positive phase-sequence component, the voltage coil will automatically adjust itself in accordance with the relation between the positive phase-sequence component and the corresponding phase-sequence component of voltage.

The instrument may be made to read the power factor of the negative phase-sequence power by transposing the elements of each set of impedances, as, for example, transposing the elements 16 and 17, the elements 18 and 19 and the elements 20 and 21. Broadly, the same effect may be procured by effecting any changes in the circuit connections which will produce a phase sequence of the currents in the coils of the meter opposite to that corresponding to the normal phase sequence of the main circuit.

It has been discovered that any unbalanced polyphase system of electrical quantities may be resolved into two or more symmetrical systems. These quantities, for example, may be resolved into a positive-phase-sequence component, a negative-phase-sequence component and a zero-phase-sequence component. In a three-phase three-wire system the zero-phase-sequence component is of zero value and only the positive and the negative-phase-sequence components need be considered. The power of the system may therefore be regarded as consisting of a positive phase-sequence power component and of a negative phase-sequence power component.

One object of my invention is to provide a power-factor meter that shall operate correctly when connected to a supply circuit that is distributing either a balanced or an unbalanced load current, to indicate the power factor of one of the power components.

Another object of my invention is to provide a static network that shall be connected between a measuring instrument and a supply circuit to supply out-of-phase components of the positive-phase-sequence components of the unbalanced load current to the windings of the instrument.

A further object of my invention is to provide a device of the above-indicated character that shall be simple and inexpensive in construction and effective and reliable in operation.

In the copending application of C. T. Allcutt referred to above, two current transformers are connected in open delta and two impedance devices respectively connected across the terminals of the secondary windings of the respective current transformers. The currents that are caused to traverse the two impedance devices are normally angularly displaced by 60°. The impedance devices are so proportioned that their respective power factors also differ by 60°. The voltages across the two impedance devices are, therefore, such that predetermined points of the network constituted thereby will be of the same potential when balanced current conditions obtain in the circuit. As the circuit becomes unbalanced, the potential difference between these points corresponds to, and is a measure of, the degree of unbalance in the circuit.

Figure 2:
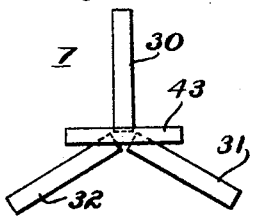

My invention may best be understood by reference to the accompanying drawing,

Figure 1 of which is a diagrammatic view of the various circuits and windings that are employed in connection with my present invention; and Fig. 2 is a semi-diagrammatic view indicating the preferred arrangement of the various coils of the meter that is shown in Fig. 1.

Referring to the drawing, the system here shown comprises a plurality of supply-circuit conductors 1, 2 and 3, in which balanced or unbalanced currents may obtain, in accordance with the distribution of load in the three phases. A plurality of series transformers 4, 5 and 6 are associated with the respective supply-circuit conductors to supply energy to a power-factor meter 7, through the medium of a static network 8.

The series transformer 4 comprises a primary winding 10 that is inserted in the supply-circuit conductor 1 and a secondary winding 13. Similarly, the series transformers 5 and 6, respectively, comprise primary windings 11 and 12 and secondary windings 14 and 15.

As a part of the static network 8, a resistor 16 and a combined resistor and reactor or inductive impedance 17 are connected across the terminals of the secondary transformer winding 13. Similar circuits, respectively comprising a resistor 18, the resistance of which is equal to that of the resistor 16, and a combined resistor and reactor 19, and, in the second place, another equal resistor 20 and a combined resistor and reactor 21, are respectively connected across the terminals of the remaining secondary windings 14 and 15.

The power-factor meter 7 is provided with three current windings 30, 31 and 32, respectively, forming what may be considered as a polyphase winding, and which are connected in a closed loop, including the conductor 33. The junction of the current coils 30 and 31 is connected to a point intermediate the resistor 16 and the combined resistor and reactor 17, while the junction of the current windings 31 and 32 is connected to a point intermediate the resistor 18 and the combined resistor and reactor 19.

In a similar manner the conductor 33, which joins the outer terminals of the windings 30 and 32, is connected to a point intermediate the resistor 20 and the combined resistor and reactor 21. To complete the necessary interconnections, a conductor 34 serves to join the outer end of the resistor 16 to the outer end of the combined resistor and reactor 19, while the conductors 35 and 36 serve similar purposes with respect to the remaining pairs of combinations of the elements of the network that are connected across the secondary windings 13, 14 and 15.

The characteristics of the resistor 16 and the impedance 19 are such that their impedances are equal but their power factors differ by an angle of 60°. Similarly, the resistor 18 and the impedance device 21 have corresponding relative characteristics as have likewise the resistor 20 and the impedance device 17.

The voltage element of the power-factor meter may comprise a single coil that is connected across any desired phase. In the drawing, a voltage transformer 40 has its primary winding 41 connected across the supply-circuit conductors 1 and 2, the secondary winding 42 of the transformer being adapted to supply energy to the voltage coil 43 of the power-factor meter.

The preferred mechanical relation of parts is illustrated in Fig. 2, wherein it will be seen that the current windings 30, 31 and 32 are preferably placed a hundred and twenty degrees apart, while the voltage coil 43 may be located at right-angles to the current winding 30, for example.

The static network described, in combination with the current windings of the power-factor meter, because of its symmetrical relation to the various series transformers and also because of the substantially equal values of resistance and impedance in the various sets of elements, one set, for example, comprising the resistor 16 and the combined resistor and reactor 17, is such that equal potential differences and electrical effects occur in the several current windings in the case of a balanced voltage obtaining upon the supply circuit.

However, in the event of an unbalanced-current condition in the supply circuit, positive-phase-sequence components in the various current windings also maintain the desired inter-relations and, thus, in conjunction with the voltage coil 43, furnish a reliable and accurate indication, under all conditions, of the power-factor of the positive phase-sequence or of the negative phase-sequence power of the circuit to which the meter is connected.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a three-phase electric circuit, the combination with three series transformers connected in the respective phase conductors and a power-factor meter having three current windings, of a resistor and a reactive impedance connected in series relation across each transformer and connections between said windings, resistors and impedances, the characteristics of the resistors and impedances being such that the windings are traversed by current proportional to the positive phase-sequence component of the current traversing the circuit.

2. In a three-phase electric circuit, the combination with three series transformers and a power-factor meter having three current windings, of two equal impedances connected in series relation across each transformer and means for connecting the impedances to the current windings the characteristics of the impedances being such that the windings are supplied with current proportional to the positive-phase-sequence component of the current traversing the circuit.

3. In a polyphase electric circuit, the combination with a plurality of series transformers and a power-factor meter having a corresponding number of current windings, of two equal impedances of unlike phase characteristics connected in series relation across each transformer and means for symmetrically interconnecting said current windings to the series circuits to cause a current to traverse said windings proportional to a symmetrical component of the currents traversing said polyphase circuit.

4. In a polyphase electric circuit, the combination with a plurality of series transformers and a power-factor meter having a corresponding number of current windings and a voltage winding, of two equal impedances of unlike phase characteristics connected in series relation across each transformer, connections between said impedances and said windings to cause a current to traverse the latter proportional to a symmetrical component of the currents traversing the polyphase circuit and connections between said voltage winding and the circuit.

5. In a polyphase electric circuit, the combination of means for segregating a phase-sequence component of an electrical quantity of the circuit comprising a plurality of groups of equal impedances of unlike phase characteristics, said groups being symmetrically connected to different phase conductors of the circuit and an electroresponsive device having a polyphase winding so connected to said impedances as to be energized in accordance with said component.

In testimony whereof, I have hereunto subscribed my name this first day of August 1921.

ALEXANDER NYMAN.